United States Patent
Chujo et al.

(10) Patent No.: US 12,493,567 B2
(45) Date of Patent: Dec. 9, 2025

(54) STORAGE APPARATUS AND CONTROL METHOD FOR STORAGE APPARATUS

(71) Applicant: Hitachi, Ltd., Tokyo (JP)

(72) Inventors: Norio Chujo, Tokyo (JP); Masanori Takada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 131 days.

(21) Appl. No.: 18/599,738

(22) Filed: Mar. 8, 2024

(65) Prior Publication Data

US 2024/0427713 A1    Dec. 26, 2024

(30) Foreign Application Priority Data

Jun. 22, 2023  (JP) ................................. 2023-102543

(51) Int. Cl.
  *G06F 13/16*  (2006.01)
  *G06F 12/0804*  (2016.01)
  *G06F 12/0868*  (2016.01)

(52) U.S. Cl.
  CPC ...... *G06F 13/1663* (2013.01); *G06F 12/0868* (2013.01); *G06F 13/1668* (2013.01)

(58) Field of Classification Search
  CPC ............. G06F 13/1663; G06F 12/0868; G06F 13/1668
  USPC ...................................................... 711/154
  See application file for complete search history.

(56) References Cited

U.S. PATENT DOCUMENTS

| | | | |
|---|---|---|---|
| 2003/0131192 A1* | 7/2003 | Nakamura | G06F 3/0613 711/114 |
| 2017/0068470 A1* | 3/2017 | Ravimohan | G06F 12/0246 |
| 2020/0409604 A1* | 12/2020 | Tajima | G06F 12/0238 |

FOREIGN PATENT DOCUMENTS

JP    2016-513316 A    5/2016

* cited by examiner

*Primary Examiner* — Arpan P. Savla
*Assistant Examiner* — Sidney Li
(74) *Attorney, Agent, or Firm* — PROCOPIO, CORY, HARGREAVES & SAVITCH LLP

(57) ABSTRACT

A storage apparatus includes a first controller having a first memory, a second controller having a second memory, and a memory module having a third memory. The first memory stores drive control information including a correspondence between a logical address and a physical address, first cache data in a data input-output (I/O) process, and first cache control information including a correspondence between a logical address and a cache address of the first cache data. The second memory stores drive control information, second cache data in the data I/O process, and second cache control information including a correspondence between a logical address and a cache address of the second cache data. The third memory stores first cache data provided with redundancy and second cache data provided with redundancy.

6 Claims, 13 Drawing Sheets

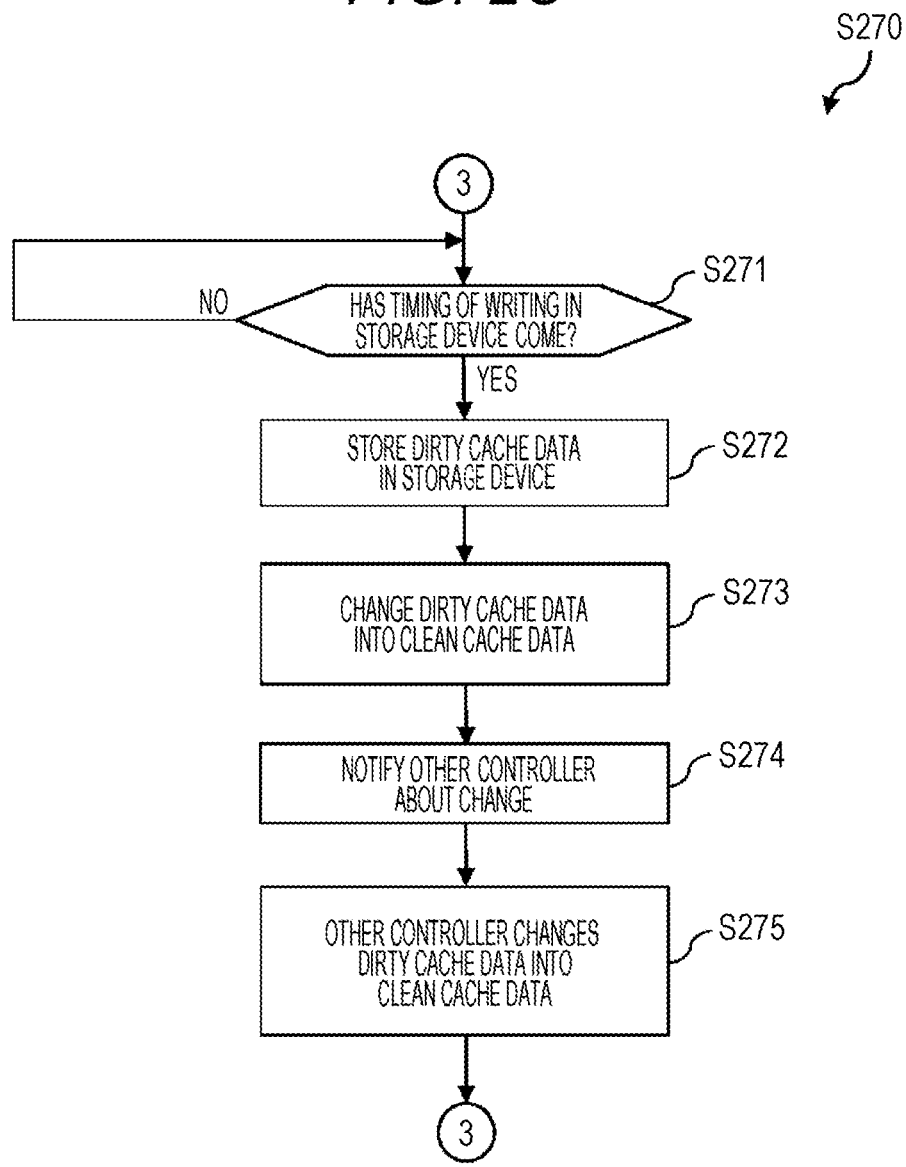

STORAGE APPARATUS AND CONTROL METHOD FOR STORAGE APPARATUS

BACKGROUND OF THE INVENTION

1. Field of the Invention

The present invention relates to a storage apparatus and a control method for the storage apparatus.

2. Description of the Related Art

In recent years, against the backdrop of an increase in the utilization of cloud services with the progress of information technology (IT) and the promotion of digital transformation (DX) and the like, reliability and availability have been required of storage apparatuses operating in a data center (DC), an internet data center (IDC) and the like more than ever before. Thus, various techniques for enhancing the reliability and availability of such storage apparatuses have been proposed.

For example, JP 2016-513316 A discloses a data access system configured to solve a problem such that the performance of a central processing unit (CPU) of a control system functioning as an information providing side among two control systems is excessively consumed, and the reliability of the entire system is degraded. The data access system includes two memory sharing apparatuses and two controllers connected to the memory sharing devices. The two memory sharing apparatuses constitute a memory sharing resource pool in the data access system. The controllers respectively correspond to the memory sharing apparatuses. When one controller in at least two controllers reads data in the memory sharing resource pool, the controller reads necessary data in the memory sharing resource pool by using the memory sharing apparatus corresponding to this controller. The respective memory sharing apparatuses belong to the same memory sharing resource pool and each have a plurality of memory units. The memory units are subject to uniform addressing across the memory sharing resource pool. Each memory sharing apparatus processes a memory access request received from the corresponding controller and reads data from the memory units.

SUMMARY OF THE INVENTION

A storage apparatus usually has a configuration such that redundancy is provided to a controller (a controller that inputs and outputs data to and from a storage drive such as a solid state drive (SSD)) in order to ensure reliability and availability.

In addition, in the storage apparatus, performance is enhanced by placing some data, such as data having a high access frequency, in a high-speed memory such as a dynamic random access memory (DRAM), and availability is enhanced by placing the same data in a memory provided in each of the controllers for redundancy.

However, in the storage apparatus having such a configuration, when one of the controllers is blocked, there is a problem such that the redundancy of data is impaired and thus the availability is degraded. Further, when one of the controllers is blocked, for example, the operation is switched to an operation for directly writing data to the storage drive, but this degrades the performance of the storage apparatus.

JP 2016-513316 A describes that the memory units are subject to uniform addressing in the entire memory sharing resource pool. However, J P 2016-513316 A does not disclose a mechanism that ensures reliability and availability of data while maintaining the performance of the storage apparatus in a case where one of the controllers is blocked.

An object of the present invention is to provide a storage apparatus capable of ensuring the reliability and availability of data while maintaining the performance of the storage apparatus, and a control method for the storage apparatus.

To achieve the above-described object, an aspect of the present invention provides a storage apparatus that is communicably connected to another apparatus and executes a data input-output (I/O) process in a storage device in response to a data I/O request received from the another apparatus, the storage apparatus including a first controller including a first memory, a second controller that includes a second memory and is communicably connected to the first controller, and a memory module that is communicably connected to the first controller and the second controller and includes a third memory. The first memory stores drive control information that is information for managing a correspondence between a logical address and a physical address, the logical address being information indicating a location of data handled by the another apparatus in the data I/O process, the physical address being information indicating a location of the data in the storage device, first cache data in the data I/O process, and first cache control information that is information for managing a correspondence between the logical address of the first cache data and a cache address that is information indicating a location of the first cache data in the first memory. The second memory stores the drive control information, second cache data in the data I/O process, and second cache control information that is information for managing a correspondence between the logical address of the second cache data and a cache address that is information indicating a location of the second cache data in the first memory. The third memory stores the first cache data where a correspondence between a logical address and a cache address is managed by the first cache control information, and the second cache data where a correspondence between a logical address and a cache address is managed by the second cache control information. When the first controller is closed, the first cache data stored in the third memory is deleted, second dirty cache data that is dirty cache data of the second cache data stored in the second memory is transferred as third dirty cache data to the third memory, third cache control information that is information for managing a correspondence between the logical address of the second dirty cache data and a cache address that is information indicating a location of the second dirty cache data in the third memory is generated and stored in the third memory, second dirty cache data as the dirty cache data of the second cache data stored in the third memory before the blockage is transferred to the second memory, a correspondence between the logical address of the second dirty cache data and a cache address that is information indicating a location of the second dirty cache data in the second memory is reflected in the second cache control information, the second dirty cache data stored in the second memory is transferred to the third memory, a correspondence between the logical address of the second dirty cache data and a cache address that is information indicating the location of the second dirty cache data in the third memory is reflected in the third cache control information, and the drive control information stored in the second memory is transferred to the third memory.

Problems, configurations, and effects other than those described above will be clarified by the following description of embodiments for implementing the invention.

According to the present invention, the reliability and availability of data can be ensured while the performance of the storage apparatus is maintained.

BRIEF DESCRIPTION OF THE DRAWINGS

FIG. 2C illustrates an example of a process for writing to a storage device;

DESCRIPTION OF THE PREFERRED EMBODIMENTS

Figure 1:
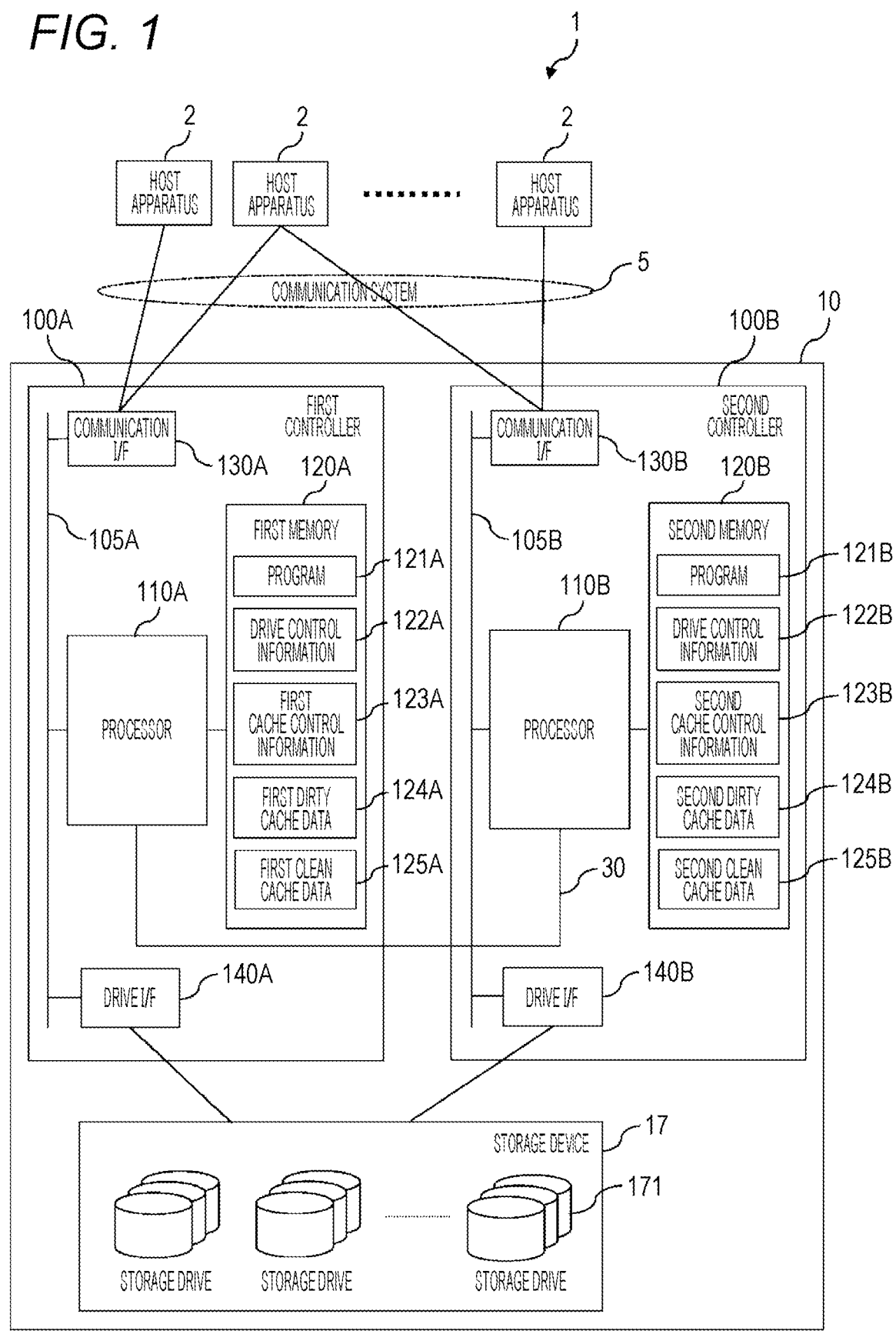
FIG. 1 illustrates an example of a storage system.

Hereinafter, embodiments of the present invention will be described with reference to the drawings. The following embodiments are just examples for describing the present invention, parts of which are omitted or simplified as appropriate for the sake of clarity of description. Moreover, the present invention can be implemented in various other modes. Unless otherwise specified, each component may be singular or plural.

In the following description, in a case where a plurality of components having an identical or similar function is present, identical reference numerals with different subscripts may be given to the components in the description. Further, in a case where the plurality of components does not have to be particularly distinguished, the description may be made with the subscripts being omitted.

Hereinafter, examples of various types of information may be described in terms of expressions such as "information" and "data", but various types of information may be expressed in a data structure ("table", "list", or the like) other than these. Further, when the components are distinguishably described, expressions such as "identification information", "identifier", and "ID" are used, but these can be replaced with each other.

Hereinafter, a process executed by various apparatuses that function as information processing apparatuses (computers) executing a program will be described in some cases. The information processing apparatus executes a process defined by a program using a memory resource (for example, a memory) and an interface by a processor (for example, a central processing unit (CPU) or a graphics processing unit (GPU)) executing the program. Therefore, the subject of the process executed by executing the program may be a processor. Similarly, the subject of the process executed by executing the program may be a controller, an apparatus, a system, a computer, or a node having a processor.

The subject of the process executed by executing the program only needs to function as at least an arithmetic unit, and may include, for example, a dedicated circuit, which executes a specific process, such as a field programmable gate array (FPGA), an application specific integrated circuit (ASIC), or a complex programmable logic device (CPLD).

Further, in the following description, input-output may be referred to as "I/O", and an interface may be referred to as "I/F".

In addition, in the following description, a letter "S" added before a reference numeral means a process step.

FIG. 1 illustrates an example of a storage system 1. As illustrated in the drawing, the illustrated storage system 1 includes a host apparatus 2 (also referred to as a "server apparatus", an "external apparatus", or the like), a communication system 5, and a storage apparatus 10.

The host apparatus 2 is communicably connected to the storage apparatus 10 via the communication system 5. Note that the communication system 5 is, for example, a memory area network (SAN), a local area network (LAN), a wide area network (WAN), the Internet, or the like.

The host apparatus 2 (another apparatus) is an information processing apparatus (computer), which uses a memory area provided by the storage apparatus 10 via the communication system 5 as a data storage location, such as a personal computer, an office computer, a mainframe, a smartphone, or a tablet. When accessing to the memory area, the host apparatus 2 transmits an I/O request (a data writing request and data reading request) to the storage apparatus 10.

The storage apparatus 10 includes two controllers 100 (the first controller 100A and the second controller 100B) and a storage device 17. The two controllers 100 (the first controller 100A and the second controller 100B) and the storage device 107 are communicably connected via a high-speed serial communication I/F (serial advanced technology attachment (SATA), or the like), a LAN, a small area network (SAN), or the like.

The two controllers 100 (the first controller 100A and second controller 100B) are installed, for example, in a housing (case, rack, or the like) of the storage apparatus 10 in a detachable state as independent substrates (circuit boards). Since the first controller 100A and the second controller 100B have a common basic configuration, only the first controller 100A will be described in principle when the common configuration will be described below. Which one of the two controllers 100 (the first controller 100A and the second controller 100B) receives the data I/O request transmitted from the host apparatus 2 is determined by, for example, the configurations or settings of the host apparatus 2 and the communication system 5.

As illustrated in the drawing, the first controller 100A includes a processor 110A, a first memory 120A, a communication I/F 130A, and a drive I/F 140A. These components are communicably connected to each other via an internal bus (for example, a Peripheral Component Interconnect Express (PCIe)) bus or the like) capable of performing high-speed communicating. In addition, the processor 110A is communicably connected to the processor 110B of the second controller 100B via the internal bus 30 (PCIe bus or the like).

The processor 110A is configured using an arithmetic core, a cache memory, direct memory access (DMA), and the like. In response to the I/O request transmitted from the communication I/F 130A, the processor 110A executes the process related to data transfer performed among the communication I/F 130A, the first memory 120A, and the drive I/F 140A. For example, the processor 110A delivers data between the communication I/F 130A and the drive I/F 140A via the first memory 120A. The data includes data to be read from the storage device 17 (hereinafter, referred to as "read data"), and data to be written to the storage device 17 (hereinafter, referred to as the "writing data"). In addition, the processor 110A performs staging of data to the first memory 120A (reading of data from the storage device 17 to the first memory 120A) and destaging of data stored in the first memory 120A (writing of data from the first memory 120A to the storage device 17).

The communication I/F 130A communicates with the host apparatus 2 via the communication system 5. The communication I/F 130A receives a data I/O request transmitted from the host apparatus 2, and transfers the received I/O request and data (for example, writing data) transmitted together with the I/O request to the processor 110A. Further, the communication I/F 130A receives data (for example, reading data read from the storage device 17) transmitted from the processor 110A, and transmits the received data to the host apparatus 2.

Further, in the communication between the storage apparatus 10 and the host apparatus 2 performed via the communication system 5, the communication I/F 130A mutually converts a communication protocol used on the communication system 5 side and a communication protocol used on the first controller 100A side. Examples of the communication protocol used on the communication system 5 side include fiber channel, Ethernet (registered trademark), and Internet Small Computer System Interface (iSCSI). The communication I/F 130A is also referred to as a "host bus adaptor (HBA)".

The first memory 120A is configured by using a memory element, which enables a high-speed access, such as a dynamic random access memory (DRAM). The first memory 120A stores, for example, programs and data used for achieving the functions of the storage apparatus 10. In addition, the first memory 120A also functions as a cache that temporarily stores data of the storage device 17 and enables a faster response than the access to the storage device 17. Hereinafter, temporary data written to the first memory 120A is referred to as "cache data".

When reading data from the storage device 17 to the first memory 120A or writing data from the first memory 120A to the storage device 17, the drive I/F 140A executes a process related to data transfer with the storage device 17.

The storage device 17 includes one or more storage drives 171 which are recording media providing physical memory areas. The storage drive 171 is, for example, a semiconductor storage device (solid state drive (SSD)) or a hard disk drive (HDD). The storage device 17 may be accommodated in the same housing as the storage apparatus 10, or may be accommodated in a housing different from the housing where the storage apparatus 10 is accommodated. For example, the storage apparatus 10 provides the host apparatus 2 with the above-described memory area as a logical memory area organized by using a redundant array of inexpensive disks (RAID) technology or the like.

In addition to the above configuration, the storage apparatus 10 may include, for example, an information processing apparatus (computer) (hereinafter, referred to as a "management apparatus") that performs monitoring, control, setting, and the like of each component of the storage apparatus 10. The management apparatus includes a processor, a storage device (memory, SSD, etc.), a recording medium reading apparatus (an apparatus that reads data from a non-transitory storage medium), a communication apparatus, and an input-output apparatus (keyboard, mouse, touch panel, display, speaker, etc.). The management apparatus is communicably connected to each of the above-described components via a communication unit such as a LAN or an internal bus (PCIe or the like). Further, the management apparatus may be connected to the storage apparatus 10 via a service processor (SVP) included in the storage apparatus 10, for example. The management apparatus transfers (writes, uploads, etc.) the program and data acquired via the communication apparatus and the recording medium reading apparatus to the components of the storage apparatus 10.

As illustrated in the drawing, the first memory 120A of the first controller 100A stores each piece of information (data) including a program 121A, drive control information 122A, first cache control information 123A, first dirty cache data 124A, and first clean cache data 125A.

Further, the second memory 120B of the second controller 100B stores each piece of information (data) including a program 121B, drive control information 122B, second cache control information 123B, second dirty cache data 124B, and second clean cache data 125B.

Note that each piece of information stored in the first memory 120A of the first controller 100A and each piece of information stored in the second memory 120B of the second controller 100B having common names basically have similar meanings and properties. Hereinafter, in order to avoid overlapping description, each piece of information stored in the first memory 120A of the first controller 100A will be described.

The program 121A is, for example, a program for achieving an operating system and a device driver, or a program for achieving various applications.

The drive control information 122A is information used when the processor 110A accesses to a memory area provided by the storage device 17. The drive control information 122A includes information in which information (hereinafter, referred to as a "logical address") indicating locations of writing data and reading data specified by the data I/O request from the host apparatus 2 is associated with information (hereinafter, referred to as a "physical address") specifying the memory area in which these data are stored. The logical address is, for example, a directory name (folder name), a file name, or a uniform resource locator (URL).

The first cache control information 123A is information used when the processor 110A accesses to the first dirty cache data 124A and the first clean cache data 125A stored in the first memory 120A. The first cache control information 123A includes information in which the logical address described above is associated with information (hereinafter, referred to as a "cache address") designating the memory area of the first memory 120A that is the storage destination of the cache data.

The first dirty cache data 124A is data that has not been completely stored in the storage device 17 among the cache data stored in the first memory 120A or data whose consistency with corresponding data stored in the storage device 17 is not guaranteed (data whose contents are not synchronized). For example, data that has been stored as cache data in the first memory 120A in response to a data writing request (including a case where the content of existing data is changed (updated)) but has not been completely stored in the storage device 17 (updating has not been completed) becomes dirty cache data.

The first clean cache data 125A is cache data (hereinafter, referred to as "clean cache data") that has been already stored in the storage device 17 and whose consistency with the data stored in the storage device 17 is guaranteed among the cache data stored in the first memory 120A. Examples of the first clean cache data are data that is read from the storage device 17 to the first memory 120A in response to a data reading request and data that has been stored as cache data in the first memory 120A in response to a data writing request (including a case where the content of existing data is changed (updated)) and has been completely stored in the storage device 17 (updating has not been completed).

Note that the processor 110A manages, in the first memory 120A, information (for example, a flag) indicating whether the cache data stored in the first memory 120A is dirty cache data or clean cache data, for example, as information attached to the cache data.

Figure 2A:
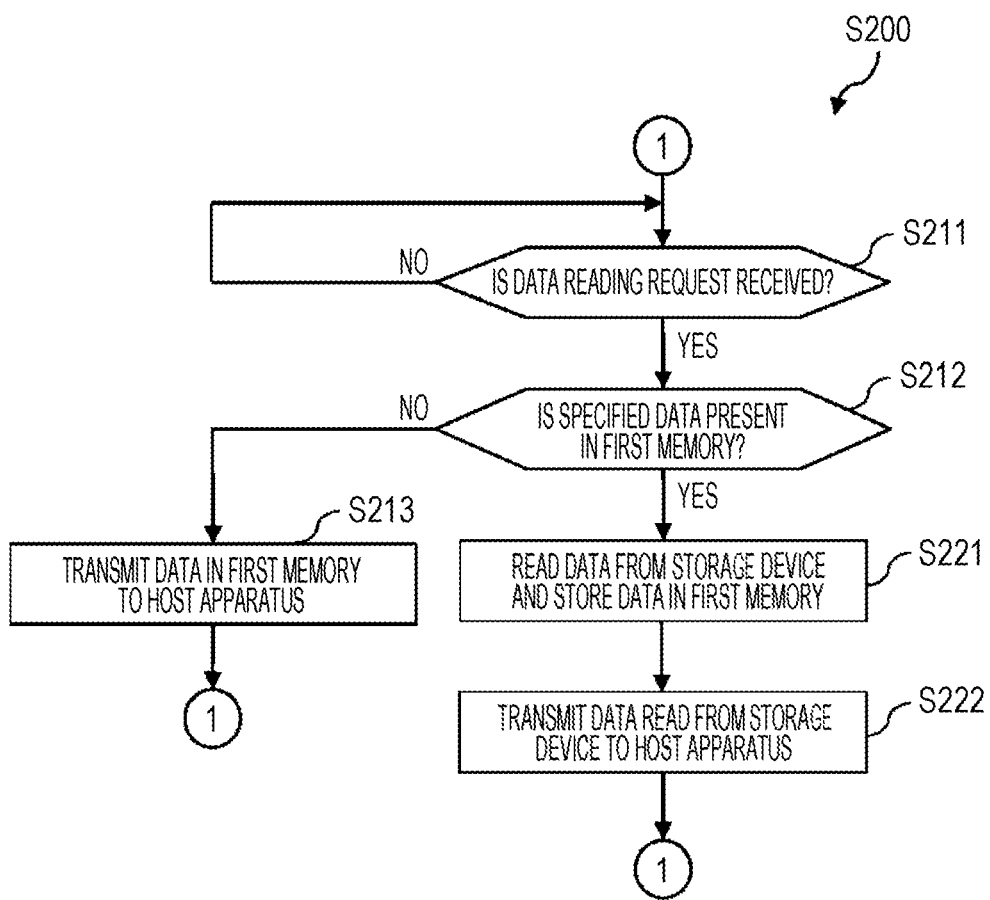
FIG. 2A illustrates an example of a data reading process.

FIG. 2A explains a main process (hereinafter, referred to as a "data reading process S200") executed by the first controller 100A in a case where a data reading request is received as the data I/O request from the host apparatus 2. Hereinafter, the data reading process S200 will be described with reference to the drawing.

The first controller 100A monitors the reception of the data reading request from the host apparatus 2 in real time (No in S211). Upon receiving the data reading request from the host apparatus 2 (YES in S211), the first controller 100A checks whether the data designated by the data reading request is stored (as cache data) in the first memory 120A with reference to the first cache control information 123A (S212).

In a case where the above data is stored in the first memory 120A (YES in S212), the first controller 100A transmits the data as read data to the host apparatus 2 (S213). Thereafter, the process returns to S211.

On the other hand, in a case where the data is not stored in the first memory 120A (NO in S212), the first controller 100A reads the data from the storage device 17, stores (stages) the data in the first memory 120A (S221), and transmits the data as read data to the host apparatus 2 (S222). Thereafter, the process returns to S211.

As described above, in a case where the data designated by the data reading request exists in the first memory 120A, the first controller 100A reads the data from the first memory 120A and transmits the data to the host apparatus 2. Therefore, the read data can be quickly provided to the host apparatus 2.

Figure 2B:
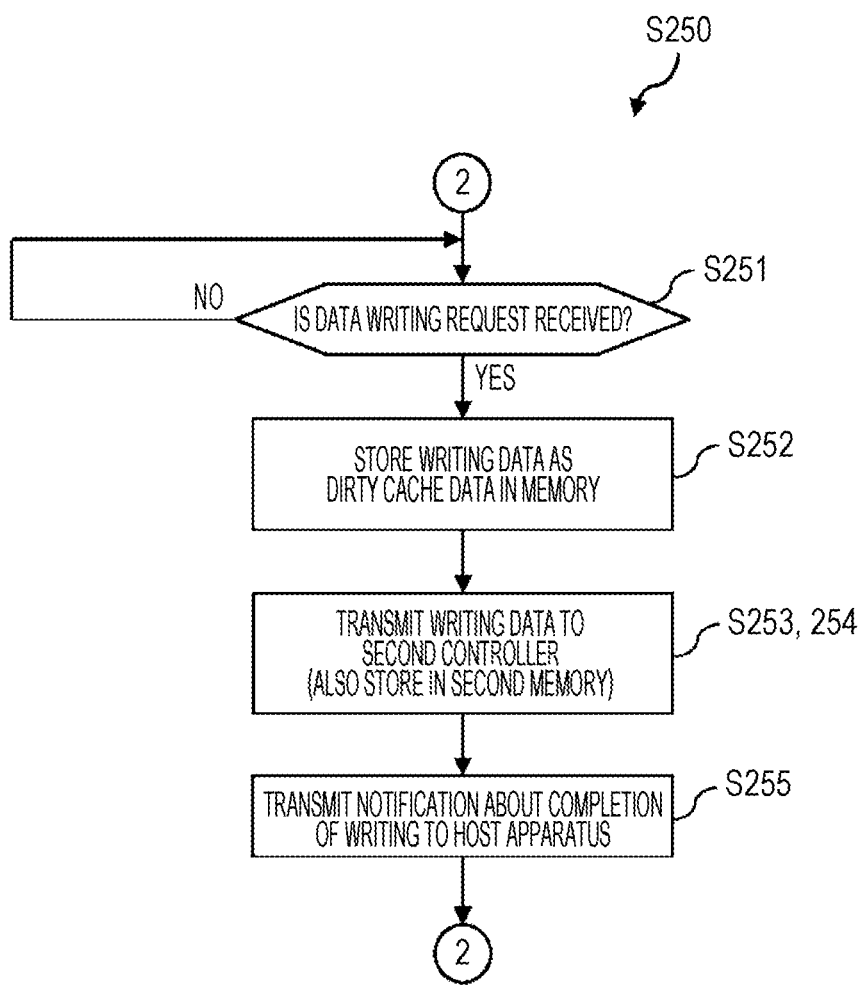
FIG. 2B illustrates an example of a data writing process.

FIG. 2B explains a main process (hereinafter, referred to as "data writing process S250") executed by the first controller 100A in a case where a data writing request is received as the data I/O request from the host apparatus 2. Hereinafter, the data writing process S250 will be described with reference to the drawing.

The first controller 100A monitors the reception of the data writing request from the host apparatus 2 in real time (No in S251). When receiving the data writing request from the host apparatus 2 (YES in S251), the first controller 100A stores the writing data received together with the data writing request in the first memory 120A (S252). The writing data stored in the first memory 120A is the first dirty cache data 124A.

Subsequently, the first controller 100A communicates with the second controller 100B via the internal bus 30, and transfers the writing data received from the host apparatus 2 to the second controller 100B (S253). The second controller 100B receives the writing data from the first controller 100A, and stores the received writing data in the second memory 120B as the second dirty cache data 124B (S254).

Subsequently, the first controller 100A transmits a notification (hereinafter, referred to as a "writing completion notification") indicating that the process of the data writing request has been completed to the host apparatus 2 (S255).

FIG. 2C explains a main process (hereinafter, referred to as a "process for writing data to the storage device S270") executed when the first controller 100A writes the first dirty cache data 124A stored in the first memory 120A to the storage device 17. Hereinafter, the process for writing data to the storage device S270 will be described with reference to the drawing.

The first controller 100A monitors whether the timing to write the first dirty cache data 124A stored in the first memory 120A to the storage device 17 has come in real time (NO in S271). Note that the above timing comes, for example, in a case where a predetermined time has elapsed from the timing at which the writing data is written to the first memory 120A.

When the above timing comes (YES in S271), the first controller 100A stores the first dirty cache data 124A stored in the first memory 120A into the storage device 17 (S272). As a result, the first dirty cache data 124A is changed to the first clean cache data 125A (S273).

Subsequently, the first controller 100A notifies the second controller 100B via the internal bus 30 that the first dirty cache data 124A has become clean cache data (S274). Upon receiving the notification, the second controller 100B deletes the second dirty cache data 124B corresponding to the first dirty cache data 124A from the memory (S275).

With the above mechanism, even in a case where either of the two controllers 100 (the first controller 100A and the second controller 100B) is blocked (function stops), the storage apparatus 10 can cause the other controller 100 to continue the service for the host apparatus 2.

However, when one of the controllers 100 is closed, the redundancy of the first dirty cache data 124A or the second dirty cache data 124B is impaired, and the availability is degraded. Further, in this case, for example, the operation is switched to an operation for directly writing data to the storage drive 170 having lower performance than the memory 120, but the performance of the storage apparatus 10 is degraded.

Therefore, in the storage system 1 of the present invention, the storage apparatus 10 is configured as described below to solve the above problem. Hereinafter, a specific description will be given.

First Embodiment

Figure 3A:
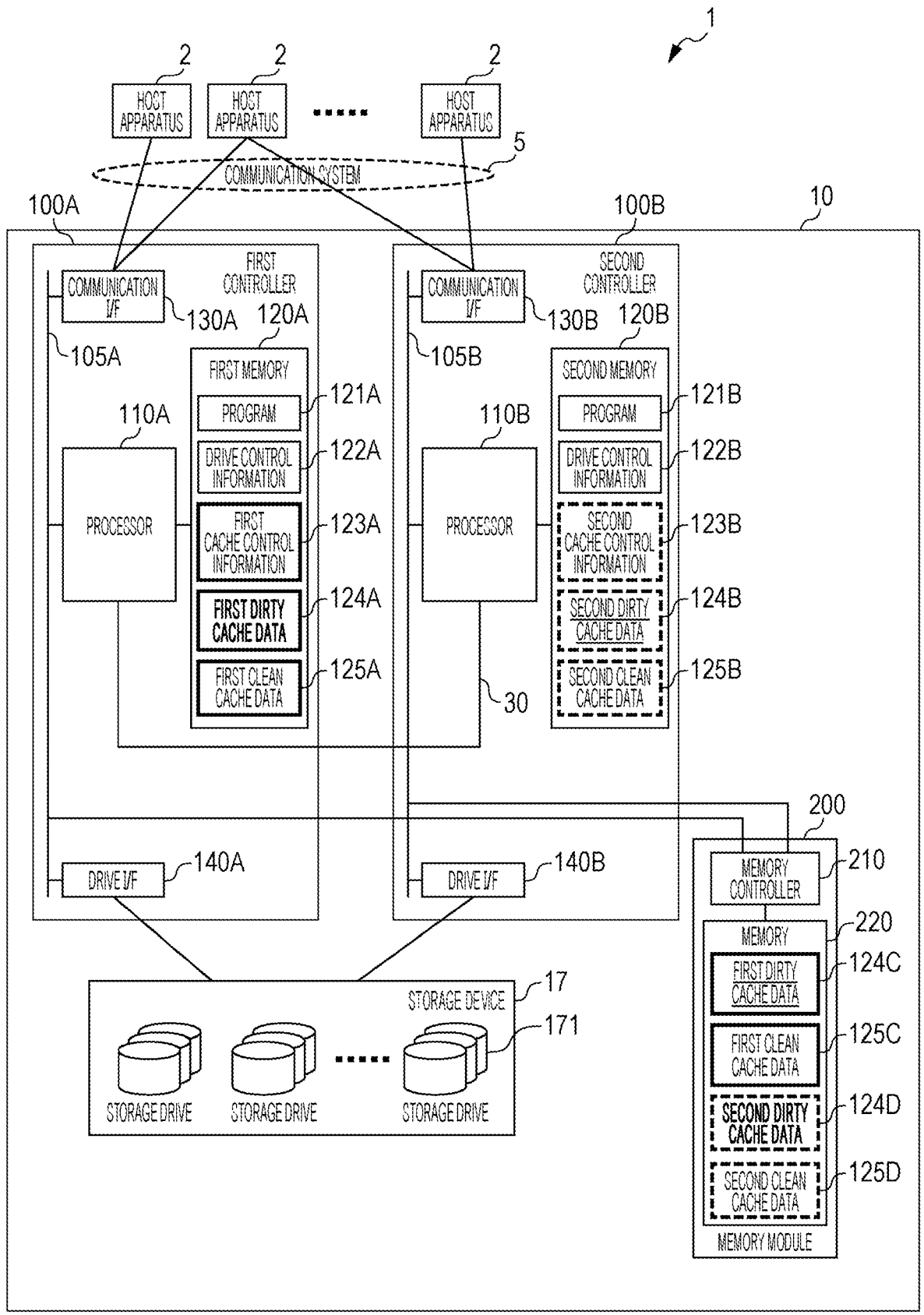
FIG. 3A illustrates an example of a storage system according to a first embodiment.

FIG. 3A illustrates a configuration of the storage system 1 according to the first embodiment. The storage system 1 illustrated in the drawing is different from the storage system 1 illustrated in FIG. 1 in that the storage apparatus 10 further includes a memory module 200.

For example, the memory module 200 is disposed in a housing of the storage apparatus 10 in a detachable state as a substrate (circuit board) independent of the two controllers 100 (the first controller 100A and the second controller 100B). Power is supplied to the memory module 200 independently of the two controllers 100 (the first controller 100A and the second controller 100B), and even in a case where power supply to the controllers 100 is lost, data loss can be prevented.

The memory module 200 includes a memory controller 210 and a third memory 220. The memory controller 210 and the third memory 220 are communicably connected via an internal bus (such as PCIe). In addition, the memory controller 210 is communicably connected to the processor 110A of the first controller 100A and the processor 110B of the second controller 100B via an internal bus (PCIe, a compute express link (CXL), or the like).

The memory controller 210 communicates with the processor 110A of the first controller 100A and the processor 110B of the second controller 100B, and writes or reads data to or from the third memory 220 in response to an instruction sent from the processor 110A or the processor 110B.

The third memory 220 includes a volatile memory element, such as a DRAM, capable of high-speed access. In addition, the third memory 220 may include a nonvolatile random access memory (NVRAM) element in which data of the volatile memory element is backed up. Even in a case where power supply to the memory controller 210 is lost, data loss can be prevented.

As illustrated in the drawing, the third memory 220 of the memory controller 210 stores first dirty cache data 124C, first clean cache data 125C, second dirty cache data 124D, and second clean cache data 125D.

Among them, the first dirty cache data 124C is identical to the second dirty cache data 124B stored in the second memory 120B of the second controller 100B. In this drawing, these data are indicated by underlined italics.

Further, in the drawing, the first cache control information 123A and the data (the first dirty cache data 124A, the first dirty cache data 124C, the first clean cache data 125A, and the first clean cache data 125C) managed by the first cache control information 123A are indicated by the same thick line frames.

The second dirty cache data 124D in the third memory 220 is identical to the first dirty cache data 124A stored in the first memory 120A of the first controller 100A. Note that these data are indicated by bold italics in the drawing.

In addition, in the drawing, the second cache control information 123B and the data (the second dirty cache data 124B, the second dirty cache data 124D, the second clean cache data 125B, and the second clean cache data 125D) managed by the second cache control information 123B are indicated by the same broken line frames.

Case where Controller is Blocked

Next, the operation of the storage apparatus 10 having the above configuration in a case where one of the controllers 100 is blocked will be described. Hereinafter, a case where the first controller 100A is blocked will be described as an example.

Figure 3B:
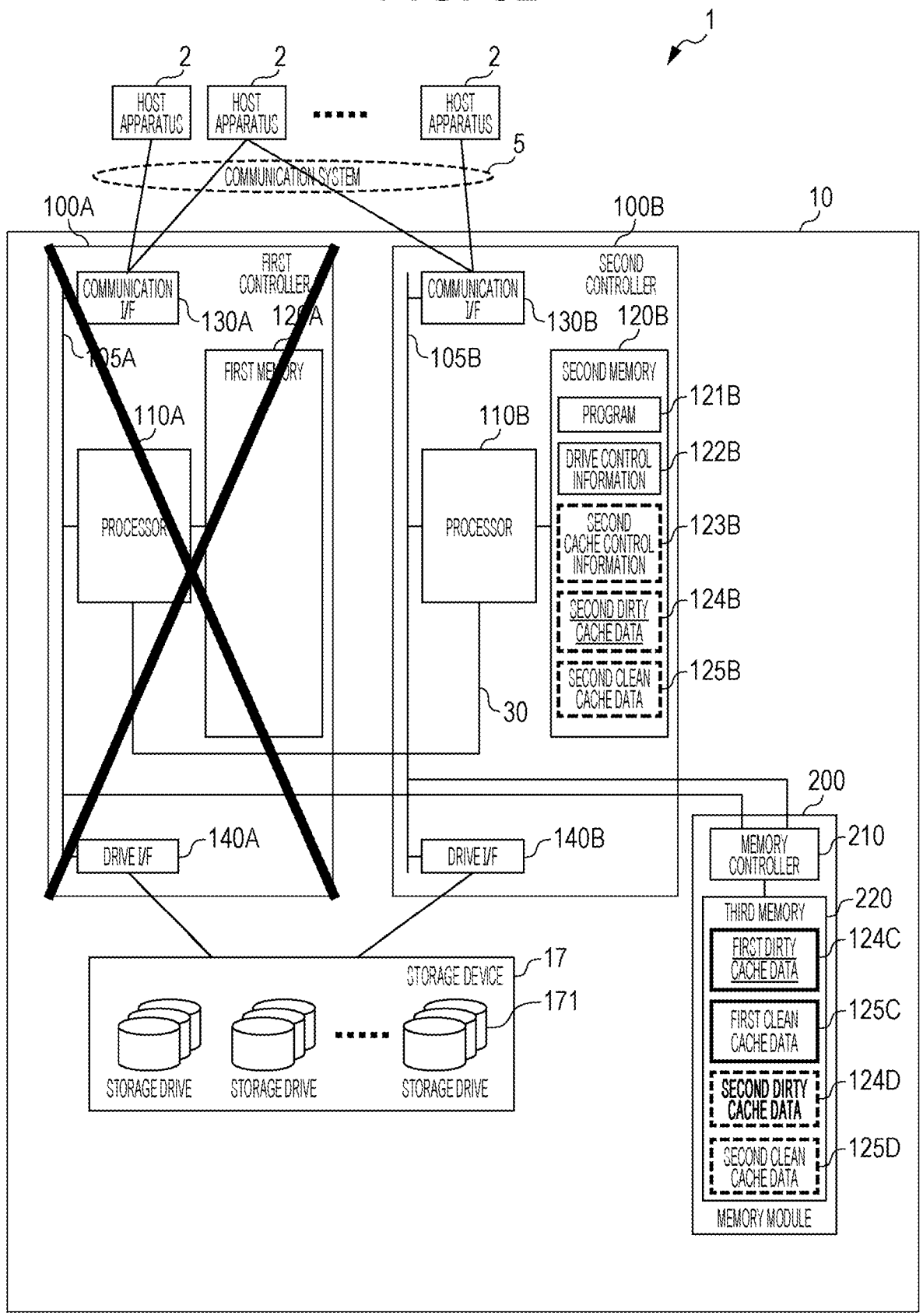
FIG. 3B explains an operation of a storage apparatus when a controller is blocked.

FIG. 3B illustrates a state immediately after the first controller 100A is blocked. As illustrated in the drawing, in the case where the first controller 100A is blocked, the memory module 200 stores the first dirty cache data 124C, the first clean cache data 125C, the second dirty cache data 124D, and the second clean cache data 125D.

Here, as for the first dirty cache data 124C and the first clean cache data 125C, since the first controller 100A is blocked, the first cache control information 123A is lost and cannot be used for the data I/O request from the host apparatus 2.

Therefore, the second controller 100B first transmits an instruction to delete the first dirty cache data 124C and the first clean cache data 125C from the third memory 220 to the memory controller 210 of the memory module 200. Upon receiving the instruction, the memory controller 210 deletes the data from the third memory 220.

Figure 3C:
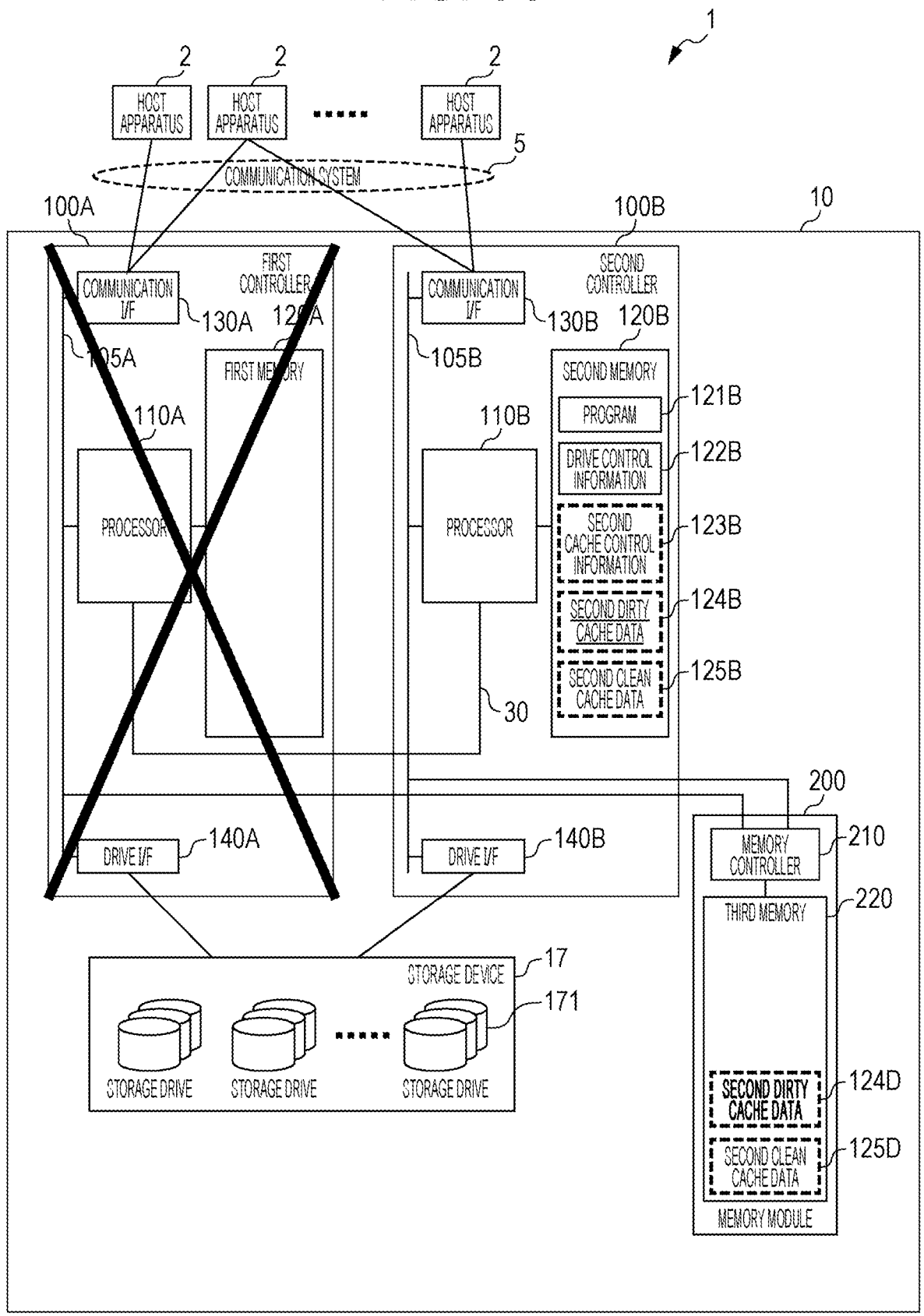
FIG. 3C explains an operation of the storage apparatus when the controller is blocked.

FIG. 3C illustrates a state of the storage system 1 after the first dirty cache data 124C and the first clean cache data 125C are deleted.

Subsequently, the second controller 100B transmits an instruction to store the second dirty cache data 124B together with the second dirty cache data 124B in the third memory 220 to the memory controller 210.

Upon receiving the second dirty cache data 124B and the above instruction, the memory controller 210 stores the received second dirty cache data 124B in the third memory 220. At this time, the memory controller 210 generates the third cache control information 123C for managing the correspondence between the logical address and the cache address of the second dirty cache data 124B stored in the third memory 220, and stores the third cache control information 123C in the third memory 220. Note that, hereinafter, the second dirty cache data 124B newly stored in the third memory 220 is referred to as third dirty cache data 124C'.

Figure 3D:
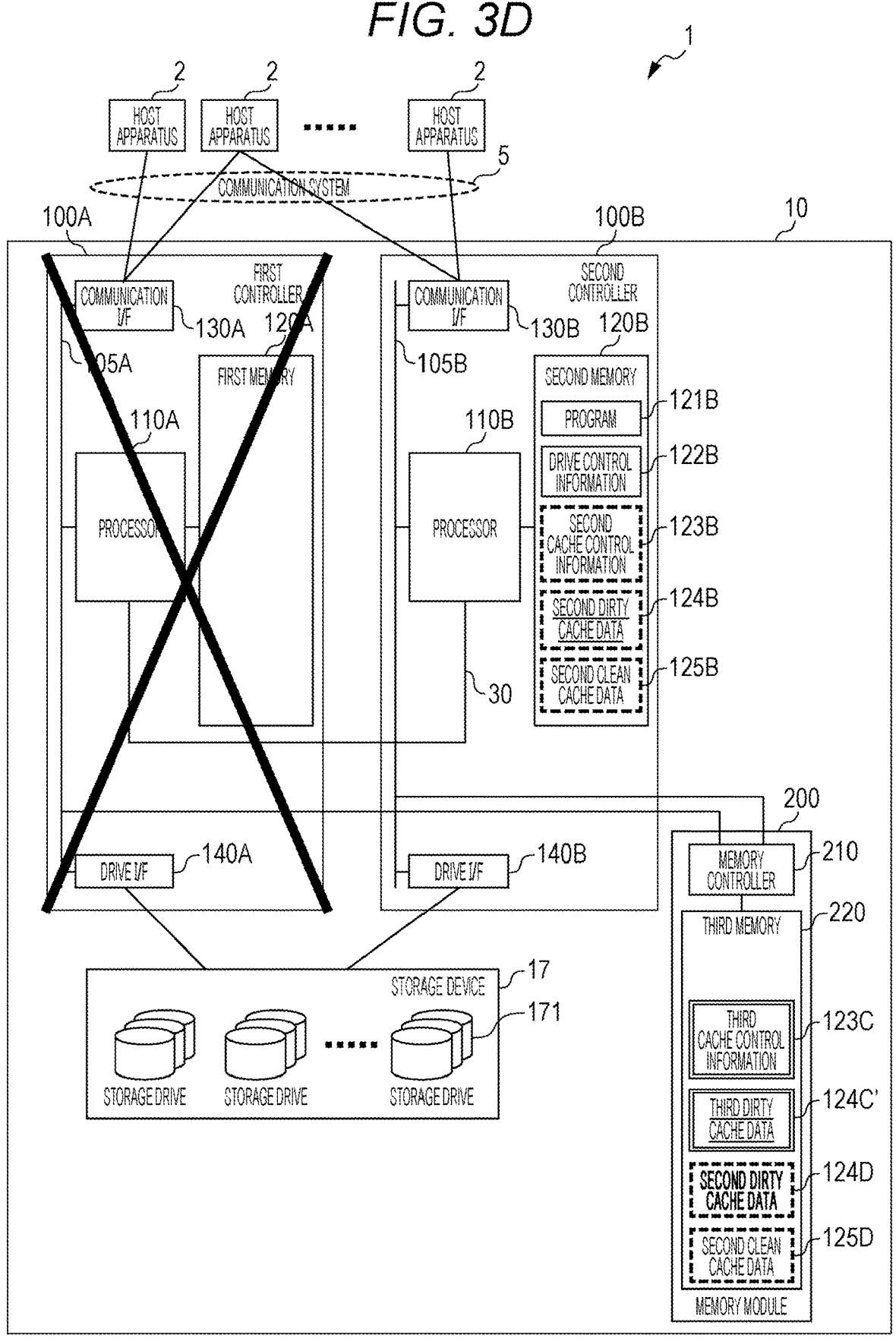
FIG. 3D explains an operation of the storage apparatus when the controller is blocked.

FIG. 3D illustrates a state of the storage system 1 after the third dirty cache data 124C' is stored in the third memory 220. Note that, since the information about the third dirty cache data 124C' has already been reflected in the third cache control information 123C, the third dirty cache data 124C' is indicated by a double line frame identical to the third cache control information 123C in the drawing.

Meanwhile, in the state illustrated in FIG. 3D, the correspondence between the logical address and the cache address (address in the third memory 220) of the second dirty cache data 124D stored in the third memory 220 of the memory module 200 is not managed. For this reason, for example, when the second controller 100B is blocked, the second dirty cache data 124D cannot be used, and the second dirty cache data 124D is lost. Therefore, the second controller 100B also manages the correspondence between the logical address and the cache address of the second dirty cache data 124D using the third cache control information 123C in the following procedure.

First, the second controller 100B instructs the memory controller 210 to transfer the second dirty cache data 124D to the second memory 120B of the second controller 100B (transfer the second dirty cache data 124D to the second memory 120B and deletes the memory module 200 from the third memory 220). Hereinafter, the second dirty cache data 124D stored in the second memory 120B by the transfer is referred to as "second dirty cache data 124D'".

Upon receiving the instruction, the second controller 100B transfers the second dirty cache data 124D to the second controller 100B. Upon receiving the second dirty cache data 124D, the second controller 100B stores the received second dirty cache data 124D in the second memory 120B. At this time, the second controller 100B manages the correspondence between the logical address and the cache address of the second dirty cache data 124D' stored in the second memory 120B in the second cache control information 123B.

Figure 3E:
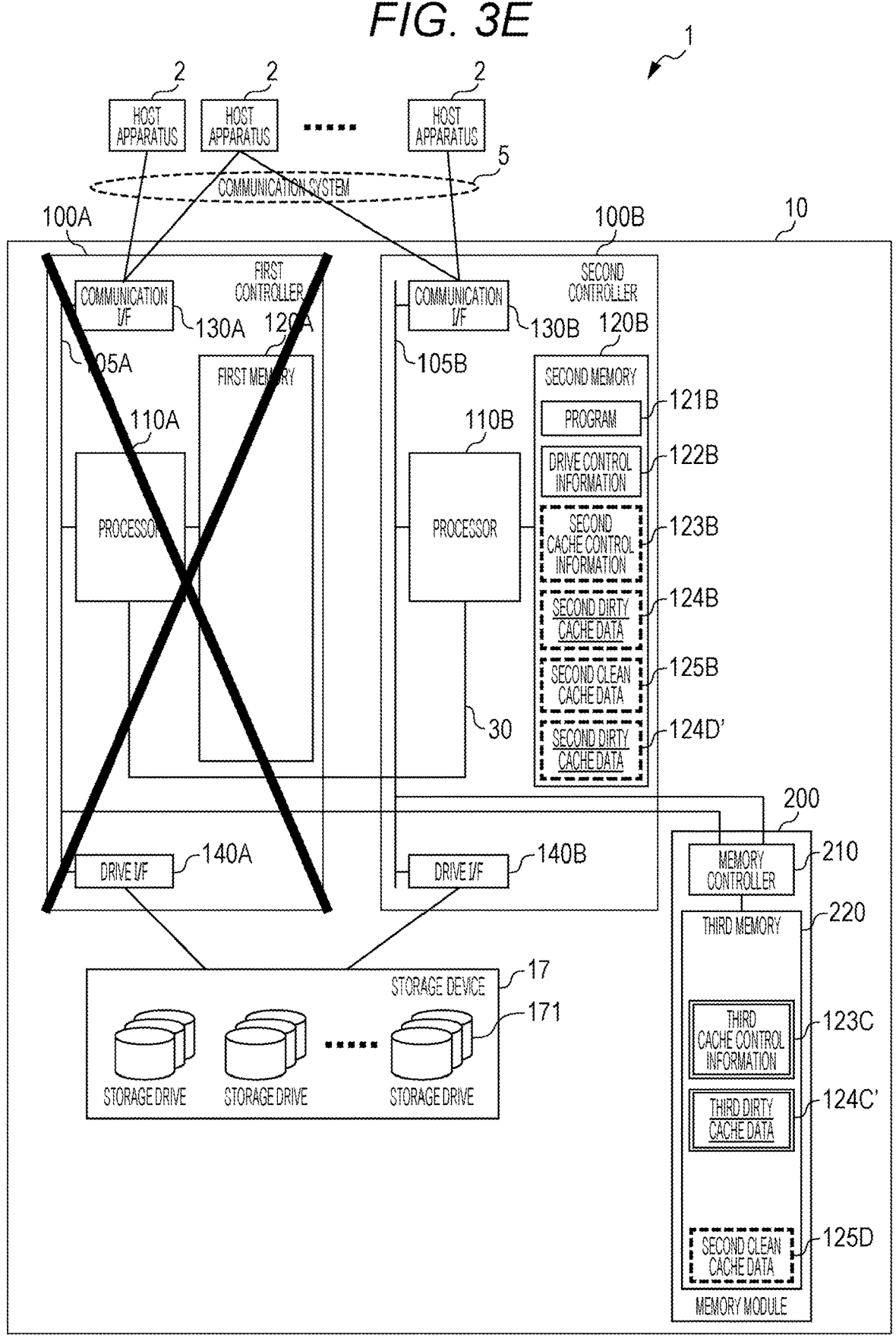
FIG. 3E explains an operation of the storage apparatus when the controller is blocked.

FIG. 3E illustrates a state of the storage system 1 at this stage. Note that, since the information about the second dirty cache data 124D' has already been reflected in the second cache control information 123B, the second dirty cache data 124D' is indicated by the broken line frame identical to the second cache control information 123B in the drawing.

Subsequently, the second controller 100B transmits, to the memory controller 210 of the memory module 200, the second dirty cache data 124D' and an instruction to store the second dirty cache data 124D' in the third memory 220.

Upon receiving the second dirty cache data 124D' and the above instruction, the memory controller 210 stores the received second dirty cache data 124D' in the third memory 220. At this time, the second controller 100B manages, in the third cache control information 123C, the correspondence between the logical address and the cache address of the second dirty cache data 124D' stored in the third memory 220. Note that, the second dirty cache data 124D' stored in the third memory 220 is referred to as "second dirty cache data 124D"".

Figure 3F:
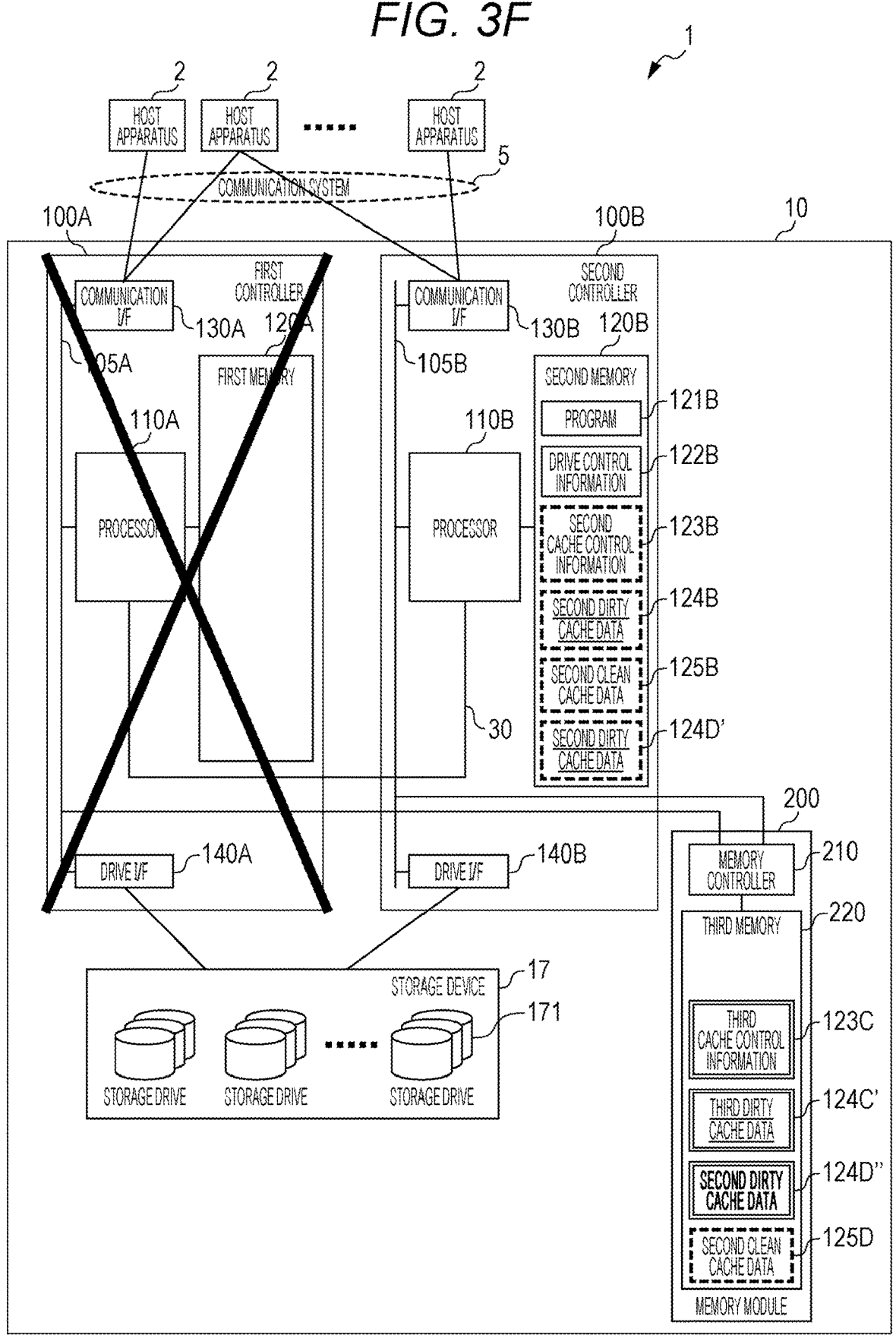
FIG. 3F explains an operation of the storage apparatus when the controller is blocked.

FIG. 3F illustrates a state of the storage system 1 at this stage. Note that, since the information about the second dirty cache data 124D" has already been reflected in the third cache control information 123C, the second dirty cache data 124D" is indicated by the double line frame identical to the third cache control information 123C in the drawing.

Note that since the first controller 100A is blocked, the drive control information 122A is lost, and the redundancy of the drive control information 122A is degraded. Therefore, the second controller 100B transmits the drive control information 122B and also an instruction to store the drive control information 122B in the third memory 220 to the memory controller 210.

Upon receiving the drive control information 122B and the above instruction, the memory controller 210 stores the received drive control information 122B in the third memory 220. No that the drive control information 122B newly stored in the third memory 220 is hereinafter referred to as drive control information 122C.

Figure 3G:
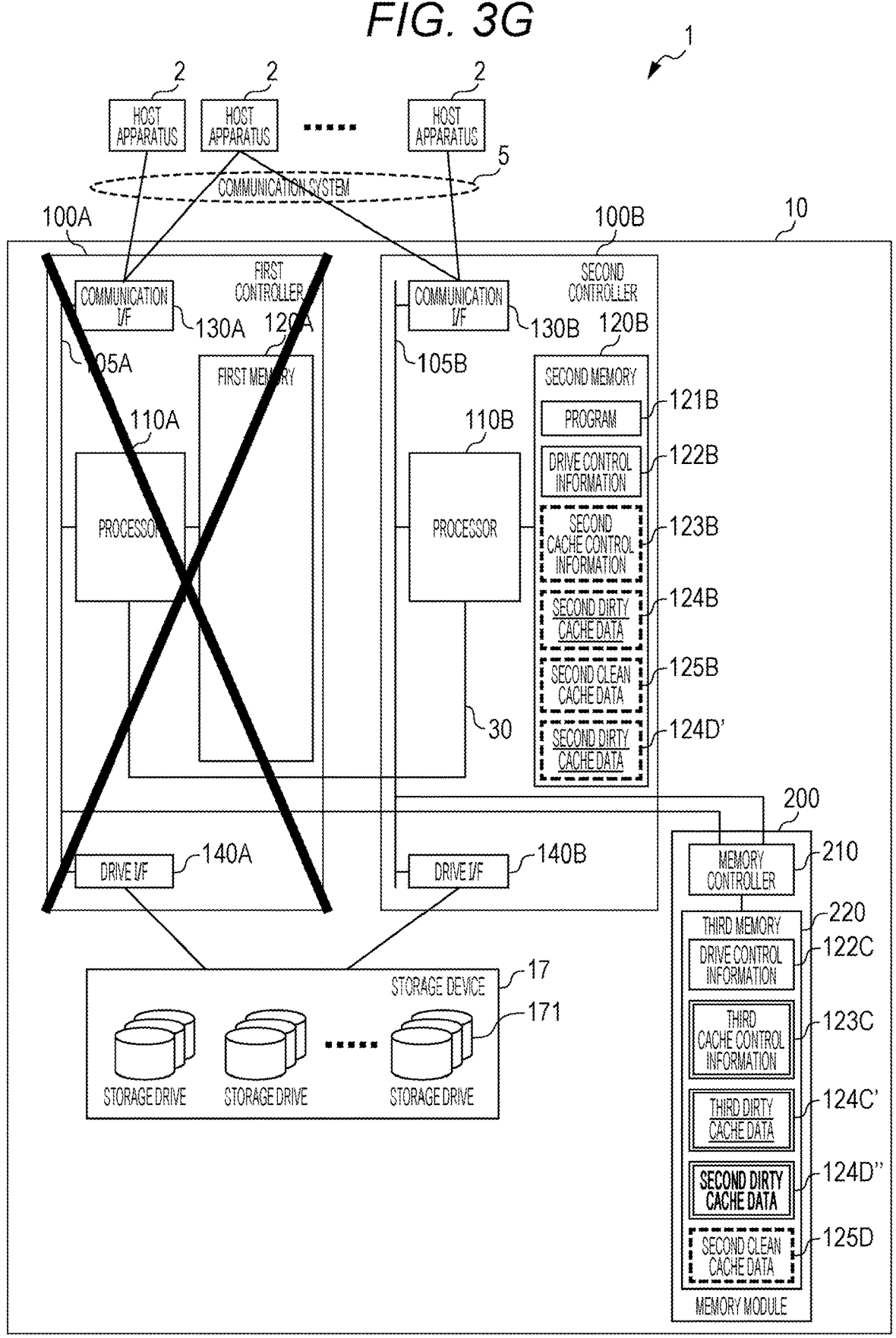
FIG. 3G explains an operation of the storage apparatus when the controller is blocked.

FIG. 3G illustrates a state of the storage system 1 after the drive control information 122C is stored in the third memory 220.

As illustrated in the drawing, in this state, for example, the drive control information 122C is obtained by providing redundancy to the drive control information 122B, the third dirty cache data 124C' is obtained by providing redundancy to the second dirty cache data 124B, and the second dirty cache data 124D" is obtained by providing redundancy to the second dirty cache data 124D'. Therefore, even in a case where the first controller 100A is blocked, for example, the operation does not have to be switched to the operation for directly writing data to the storage drive, and the storage apparatus 10 can continue a service for the host apparatus 2 without deteriorating performance. In addition, since the data is made redundant between the second controller 100 and the memory module 200 that are not blocked, the reliability and availability of the data are ensured even after the first controller 100A is blocked.

Since the corresponding data is present in the storage device 17, the second clean cache data 125B of the second memory 120B and the second clean cache data 125D of the third memory 220 may be deleted at an appropriate timing for the purpose of, for example, effective use of the memory areas of the second memory 120B and the third memory 220.

Case where Memory Module is Blocked

The above has described the operation of the storage apparatus 10 in a case where the controller 100 (the first controller 100A or the second controller 100B) is blocked. Subsequently, the operation of the storage apparatus 10 in a case where the memory module 200 is blocked when the storage apparatus 10 normally operates as illustrated in FIG. 3A will be described.

First, when detecting that the memory module 200 is blocked, the first controller 100A transmits the first dirty cache data 124A of the first memory 120A to the second controller 100B via the internal bus 30.

Upon receiving the first dirty cache data 124A from the first controller 100A, the second controller 100B stores the received first dirty cache data 124A in the second memory 120B. Hereinafter, the first dirty cache data 124A stored in the second memory 120B is referred to as "first dirty cache data 124A'".

Note that the second controller 100B manages the correspondence between the logical address and the cache address of the first dirty cache data 124A' in the second cache control information 123B.

Further, when detecting that the memory module 200 is blocked, the second controller 100B transmits the second dirty cache data 124B of the second memory 120B to the first controller 100A via the internal bus 30.

Upon receiving the second dirty cache data 124B from the second controller 100B, the first controller 100A stores the received second dirty cache data 124B in the first memory 120A. Hereinafter, the second dirty cache data 124B stored in the first memory 120A is referred to as "second dirty cache data 124B'".

Note that the first controller 100A manages the correspondence between the logical address and the cache address of the second dirty cache data 124B' in the first cache control information 123A.

Figure 4:
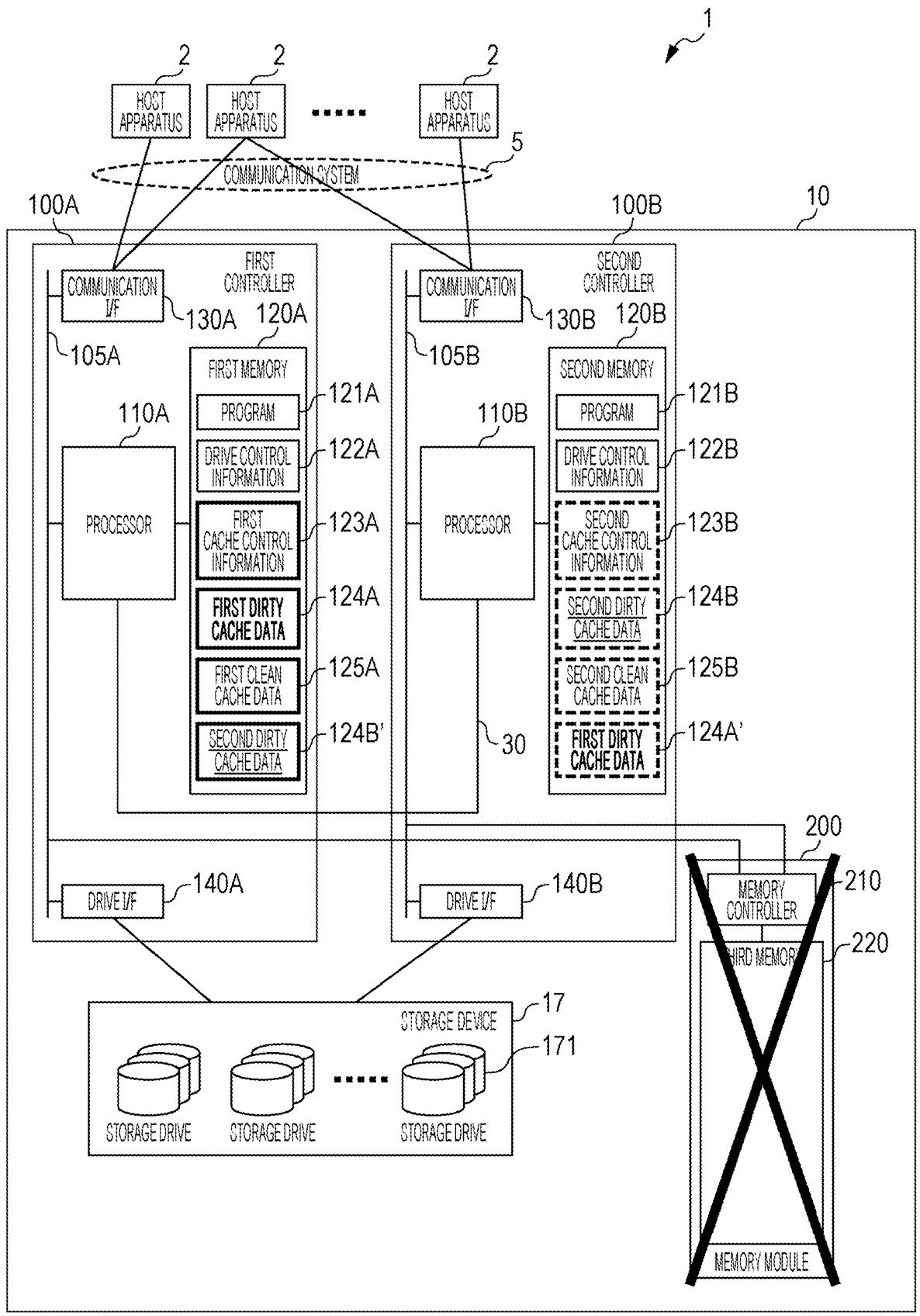
FIG. 4 explains an operation of the storage apparatus when a memory module is blocked.

FIG. 4 illustrates a state of the storage system 1 after the above process is executed. Note that the information about the first dirty cache data 124A' has already reflected in the second cache control information 123B. Therefore, in the drawing, the first dirty cache data 124A' is indicated by the broken line frame similarly to the second cache control information 123B. Further, the information about the second dirty cache data 124B' has already reflected in the first cache control information 123A. Therefore, in the drawing, the second dirty cache data 124B' is indicated by the thick line frame identical to the first cache control information 123A.

As illustrated in the drawing, in this state, the drive control information 122B is obtained by providing redundancy to the drive control information 122A, the first dirty cache data 124A' is obtained by providing redundancy to the first dirty cache data 124A, and the second dirty cache data 124B' is obtained by providing redundancy to the second dirty cache data 124B. Therefore, for example, the operation does not have to be switched to the operation for directly writing data to the storage drive, and the storage apparatus 10 can continue a service for the host apparatus 2 without deteriorating performance. In addition, since the data is made redundant between the first controller 100A and the second controller 100B, the reliability and availability of the data are ensured even after the first controller 100A is blocked.

Effects

As described above, according to the storage apparatus 10 of the first embodiment, even in a case where any of the first controller 100A, the second controller 100B, and the memory module 200 is blocked, the storage apparatus 10 can continue the service for the host apparatus 2 without deteriorating the performance. Further, even in a case where any device is blocked, data is made redundant between the devices that are not blocked, and thus reliability and availability of data are secured. As described above, according to the storage apparatus 10 of the first embodiment, the performance of the storage apparatus 10 can be maintained while the data redundancy is being ensured.

Note that since corresponding data is present in the storage device 17, the first clean cache data 125A of the first memory 120A and the second clean cache data 125B of the second memory 120B may be deleted for the purpose of, for example, effective use of the memory areas of the first memory 120A and the second memory 120B.

Second Embodiment

In the first embodiment, the drive control information 122, the cache control information 123, and the cache data (dirty cache data and clean cache data) are stored in the memory 120 of the controller 100. In the second embodiment, a plurality of memory modules 200 communicably connected to the controllers 100 is disposed in the storage apparatus 10, and the above-described data is stored in the third memories 220 of these memory modules 200. Note that, in the configurations of the storage apparatus 10, it is known that the blockage ratio of the memory 120 included in the controller 100 is relatively higher than other configurations. Therefore, by storing the data in the memory module 200 separate from the controller 100 in this way, the probability that the controller 100 is blocked can be reduced, and the availability of the communication between the host apparatus 2 and the storage apparatus 10 can be enhanced.

Figure 5:
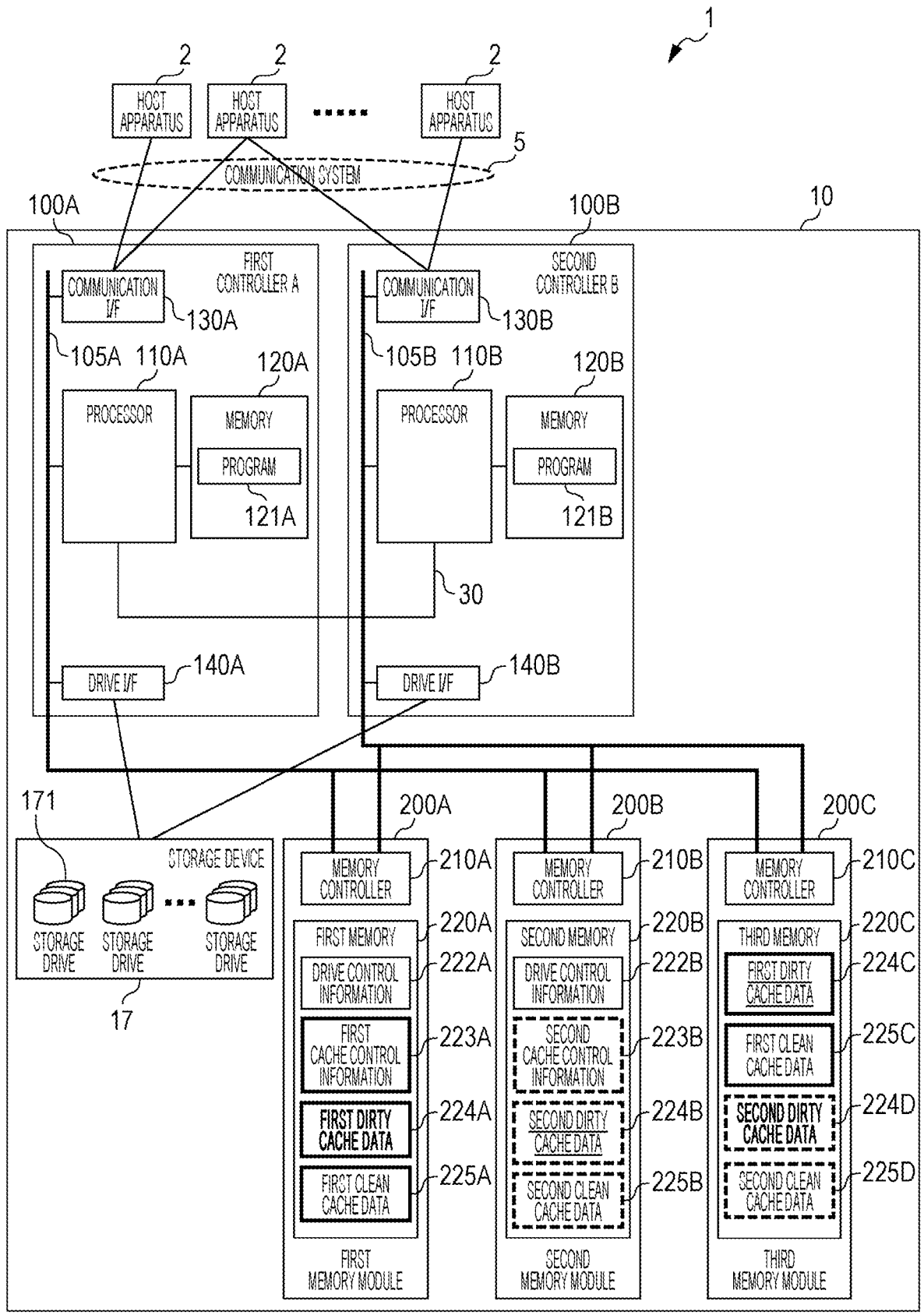
FIG. 5 illustrates an example of a storage system according to a second embodiment.

FIG. 5 illustrates an example of the storage system 1 according to the second embodiment. As illustrated in the drawing, the storage apparatus 10 in the illustrated storage system 1 includes three memory modules 200 (hereinafter, referred to as a first memory module 200A, a second memory module 200B, and a third memory module 200C). For example, the three memory modules 200 each are disposed in a housing of the storage apparatus 10 in a detachable state as a substrate (circuit board) independent of the two controllers 100 (the first controller 100A and the second controller 100B). Power is supplied to the three memory modules 200 independently of the two controllers 100 (the first controller 100A and the second controller 100B), and even in a case where power supply to the controllers 100 is lost, data loss can be prevented.

As illustrated in the drawing, data (drive control information 222A, cache control information 223A, first dirty cache data 224A, and first clean cache data 225A) is stored in the first memory 220A of the first memory module 200A. The data corresponds to data (drive control information 122A, first cache control information 123A, first dirty cache data 124A, and first clean cache data 125A) stored in the first memory 120A of the first controller 100A illustrated in FIG. 3A.

Further, data (drive control information 222B, cache control information 223B, second dirty cache data 224B, and second clean cache data 225B) is stored in the second memory 220B of the second memory module 200B. The data corresponds to data (drive control information 122B, second cache control information 123B, second dirty cache data 124B, and second clean cache data 125B) stored in the second memory 120B of the second controller 100B illustrated in FIG. 3A.

Further, data (first dirty cache data 224C, first clean cache data 225C, second dirty cache data 224D, and second clean cache data 225D) is stored in the third memory 220C of the third memory module 200C. The data corresponds to data (first dirty cache data 124C, first clean cache data 125C, second dirty cache data 124D, and second clean cache data 125D) stored in the third memory 220 of the memory module 200 illustrated in FIG. 3A.

The first memory 220A of the first memory module 200A corresponds to the first memory 120A of the first controller 100A in the first embodiment. Further, the second memory 220B of the second memory module 200B corresponds to the second memory 120B of the second controller 100B in the first embodiment. Further, the third memory 220 of the third memory module 200C corresponds to the third memory 220 of the memory module 200 in the first embodiment. Then, the first controller 100A and the second controller 100B of the second embodiment executes the processes and control similar to the process and control illustrated in FIGS. 3A to 3G on the data stored in each of the memories 220 (the first memory 220A, the second memory 220B, and the third memory 220C).

As described above, the storage apparatus 10 of the second embodiment does not store the data (the drive control information 222, the cache control information 223, and the cache data (the dirty cache data 224 and the clean cache data 225)) in the memory 120 of the controller 100 unlike the storage apparatus 10 of the first embodiment, but stores the data in the three memory modules 200 (the first memory module 200A, the second memory module 200B, and the third memory module 200C). Therefore, the probability that the controller 100 is blocked can be reduced, and the availability of the communication between the host apparatus 2 and the storage apparatus 10 can be heightened.

Although the embodiments of the present invention have been described above, the present invention is not limited to the above-described embodiments, includes various modifications, and is not necessarily limited to those having all the configurations described above.

For example, the present invention can also be applied to a storage system of a type different from the storage system 1 illustrated in FIG. 1 and the like as long as the storage system is configured using a storage apparatus in which redundancy is provided to a controller and a memory module can be mounted. An example of different types of storage systems is a storage system using a storage apparatus (for example, an enterprise type storage apparatus) which includes a plurality of controllers (channel adapters) functioning as communication adapters and a plurality of drive adapters functioning as drive controllers, and is configured by connecting these devices by a switch such as a high-speed crossbar switch.

What is claimed is:

1. A storage apparatus that is communicably connected to another apparatus and executes a data input-output process in a storage device in response to a data input-output request received from the another apparatus, the storage apparatus comprising:
  a first controller including a first memory;
  a second controller including a second memory and being communicably connected to the first controller; and
  a memory module that is communicably connected to the first controller and the second controller and includes a third memory, wherein
  the first memory stores
    drive control information that is information for managing a correspondence between a logical address and a physical address, the logical address being information indicating a location of data handled by the another apparatus in the data input-output process, the physical address being information indicating a location of the data in the storage device,
    first cache data in the data input-output process, and
    first cache control information that is information for managing a correspondence between the logical address of the first cache data and a cache address that is information indicating a location of the first cache data in the first memory,
  the second memory stores
    the drive control information, second cache data in the data input-output process, and
second cache control information that is information for managing a correspondence between the logical address of the second cache data and a cache address that is information indicating a location of the second cache data in the first memory, the third memory stores
the first cache data where a correspondence between a logical address and a cache address is managed by the first cache control information, and
the second cache data where a correspondence between a logical address and a cache address is managed by the second cache control information, and wherein when the first controller is blocked,
the first cache data stored in the third memory is deleted,
second dirty cache data that is dirty cache data of the second cache data stored in the second memory is transferred as third dirty cache data to the third memory,
third cache control information is generated and stored in the third memory, the third cache control information being information for managing a correspondence between the logical address of the second dirty cache data and a cache address that is information indicating a location of the second dirty cache data in the third memory,
the second dirty cache data as the dirty cache data of the second cache data stored in the third memory before the blockage is transferred to the second memory,
a correspondence between the logical address of the second dirty cache data and a cache address that is information indicating a location of the second dirty cache data in the second memory is reflected in the second cache control information,
the second dirty cache data stored in the second memory is transferred to the third memory,
a correspondence between the logical address of the second dirty cache data and a cache address that is information indicating the location of the second dirty cache data in the third memory is reflected in the third cache control information, and
the drive control information stored in the second memory is transferred to the third memory.

2. The storage apparatus according to claim 1, wherein when the memory module is blocked,
first dirty cache data of the first cache data in the first memory is transferred to the second memory,
the second dirty cache data of the second cache data in the second memory is transferred to the first memory,
a correspondence between the logical address of the second dirty cache data and a cache address that is information indicating a location of the second dirty cache data in the first memory is reflected in the first cache control information, and
a correspondence between the logical address of the first dirty cache data and a cache address that is information indicating a location of the first dirty cache data in the second memory is reflected in the second cache control information.

3. The storage apparatus according to claim 1, wherein the first controller and the second controller further include a processor, a communication interface that communicates with the another apparatus, and a drive interface that communicates with the storage device.

4. The storage apparatus according to claim 1, wherein the memory module further includes a memory controller that communicates with the first controller and the second controller.

5. A storage apparatus that is communicably connected to another apparatus and executes a data input-output process in a storage device in response to a data input-output request received from the another apparatus, the storage apparatus comprising:
a first controller;
a second controller communicably connected to the first controller;
a first memory module that is communicably connected to the first controller and the second controller and includes a first memory;
a second memory module that is communicably connected to the first controller and the second controller and includes a second memory; and
a third memory module that is communicably connected to the first controller and the second controller and includes a third memory, wherein the first memory stores
drive control information that is information for managing a correspondence between a logical address and a physical address, the logical address being information indicating a location of data handled by the another apparatus in the data input-output process, the physical address being information indicating a location of the data in the storage device,
first cache data in the data input-output process, and
first cache control information that is information for managing a correspondence between the logical address of the first cache data and a cache address that is information indicating a location of the first cache data in the first memory, the second memory stores
the drive control information,
second cache data in the data input-output process, and
second cache control information that is information for managing a correspondence between the logical address of the second cache data and a cache address that is information indicating a location of the second cache data in the first memory, the third memory stores
the first cache data where a correspondence between a logical address and a cache address is managed by the first cache control information, and
the second cache data where a correspondence between a logical address and a cache address is managed by the second cache control information, and wherein when the first memory module is blocked,
the first cache data stored in the third memory is deleted,
second dirty cache data that is dirty cache data of the second cache data stored in the second memory is transferred as third dirty cache data to the third memory,
third cache control information is generated and stored in the third memory, the third cache control information being information for managing a correspondence between the logical address of the second dirty cache data and a cache address that is information indicating a location of the second dirty cache data in the third memory,
the second dirty cache data as the dirty cache data of the second cache data stored in the third memory before the blockage is transferred to the second memory, a correspondence between the logical address of the second dirty cache data and a cache address that is information indicating a location of a second dirty cache data in the second memory is reflected in the second cache control information, the second dirty cache data stored in the second memory is transferred to the third memory, a correspondence between the logical address of the second dirty cache data and a cache address that is information indicating a location of the second dirty cache data in the third memory is reflected in the third cache control information, and the drive control information stored in the second memory is transferred to the third memory.

6. The storage apparatus according to claim 5, wherein when the third memory module is blocked, first dirty cache data of the first cache data in the first memory is transferred to the second memory, the second dirty cache data of the second cache data in the second memory is transferred to the first memory, a correspondence between the logical address of the second dirty cache data and a cache address that is information indicating a location of the second dirty cache data in the first memory is reflected in the first cache control information, and a correspondence between the logical address of the first dirty cache data and a cache address that is information indicating a location of the first dirty cache data in the second memory is reflected in the second cache control information.

\* \* \* \* \*